Figure 1:
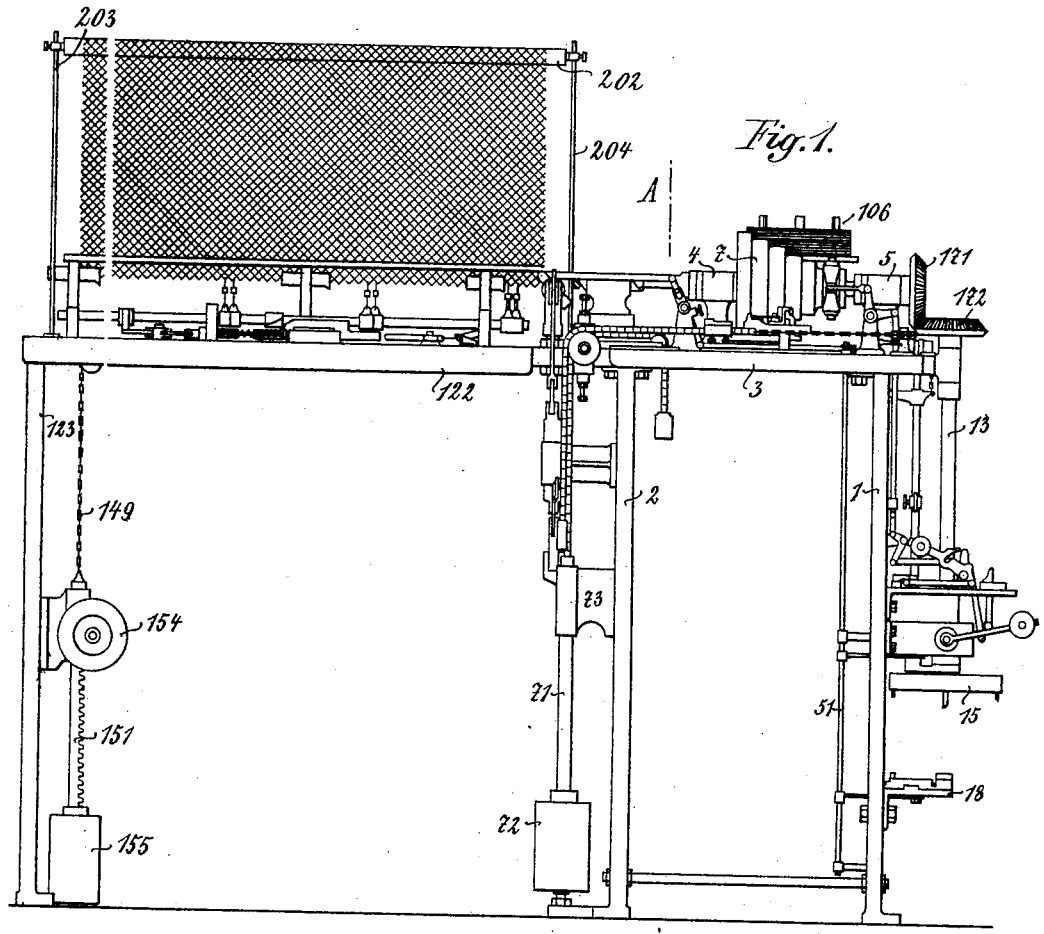

No. 803,941. PATENTED NOV. 7, 1905.
O. TÜRKE.
WIRE NETTING MACHINE.
APPLICATION FILED JULY 28, 1904.

7 SHEETS—SHEET 1.

Witnesses:
James L. Norris
C. L. Kesler

Inventor
Otto Türke
By James L. Norris
Atty.

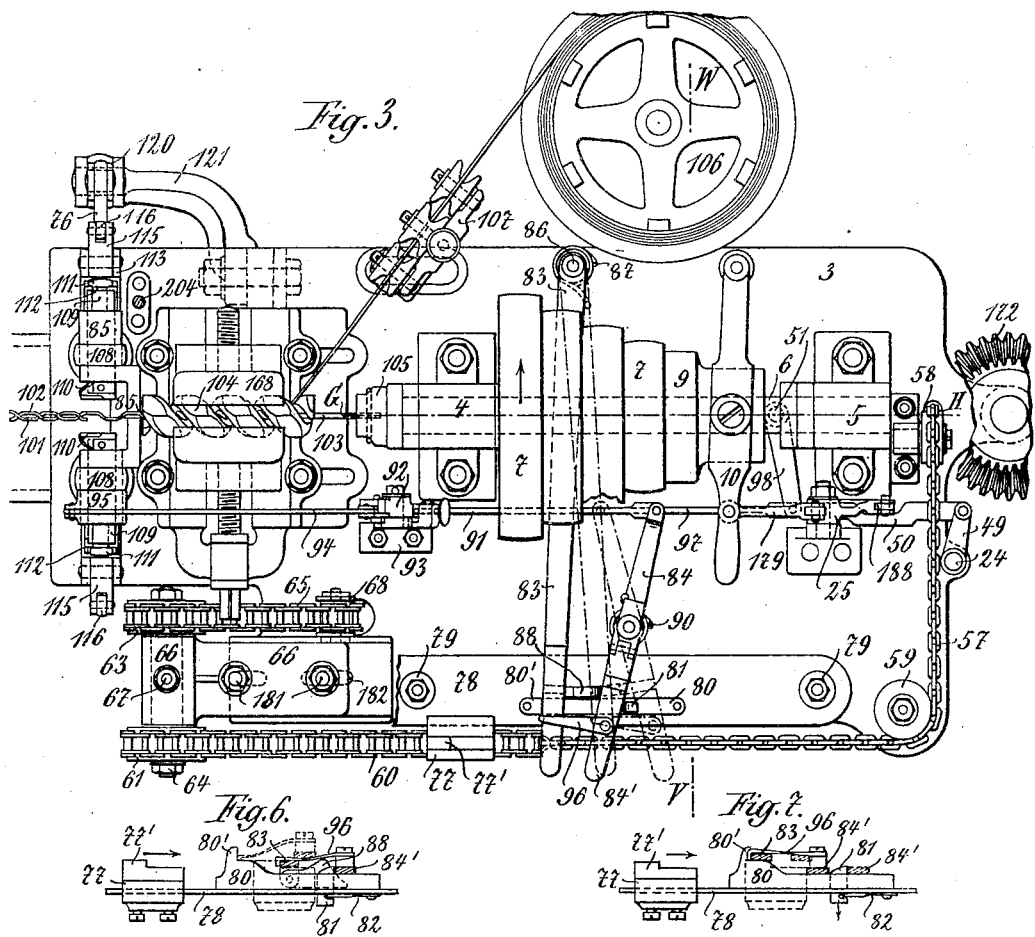
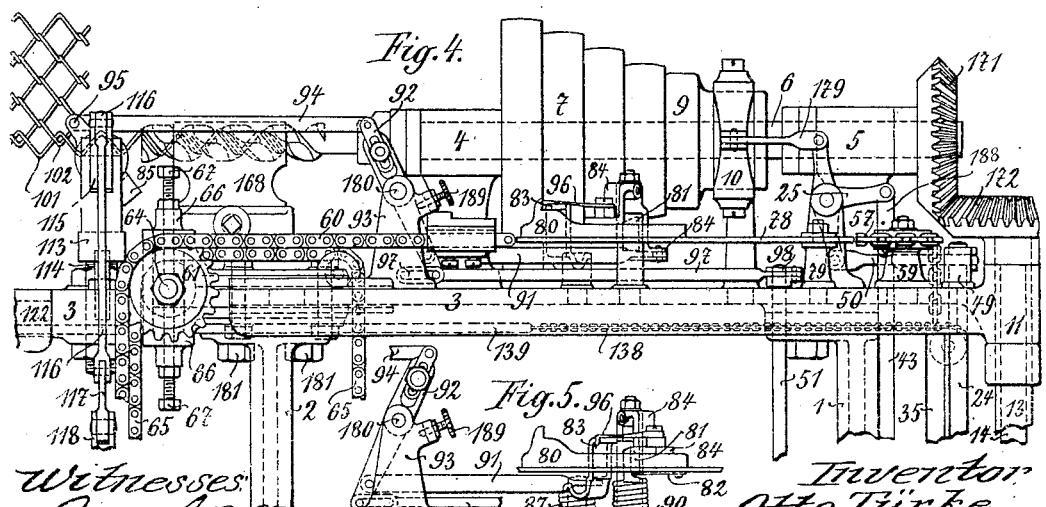

No. 803,941. PATENTED NOV. 7, 1905.
O. TÜRKE.
WIRE NETTING MACHINE.
APPLICATION FILED JULY 28, 1904.

7 SHEETS—SHEET 3.

Witnesses:
James L. Norris Jr.
C. D. Kesler

Inventor
Otto Türke
By James L. Norris
Atty

No. 803,941. PATENTED NOV. 7, 1905.
O. TÜRKE.
WIRE NETTING MACHINE.
APPLICATION FILED JULY 28, 1904.
7 SHEETS—SHEET 4.
Fig. 9.
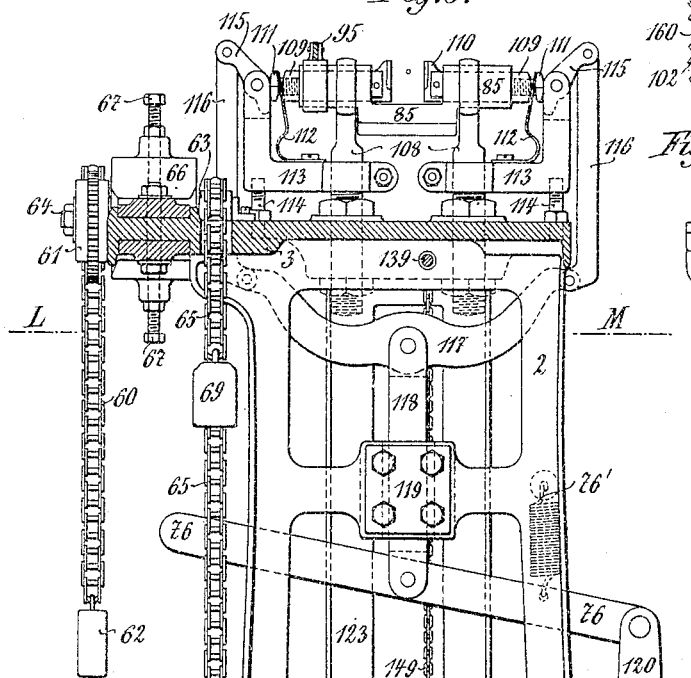
Fig. 10.
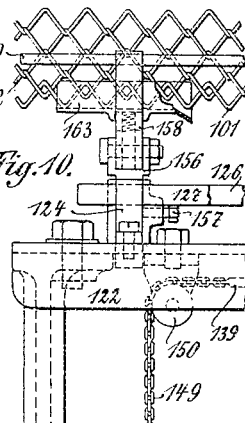
Fig. 11.
Fig. 12.
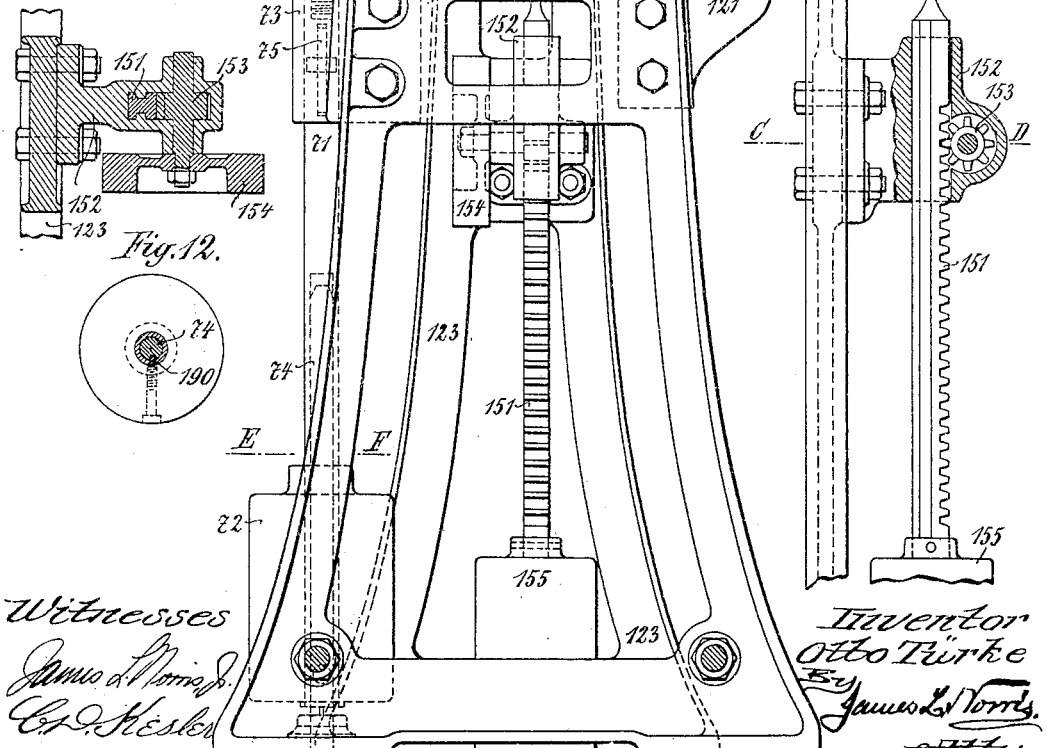
Witnesses
James L. Norris
C. D. Kesler
Inventor
Otto Türke
By James L. Norris
Atty No. 803,941. PATENTED NOV. 7, 1905.
O. TÜRKE.
WIRE NETTING MACHINE.
APPLICATION FILED JULY 28, 1904.
7 SHEETS—SHEET 5.
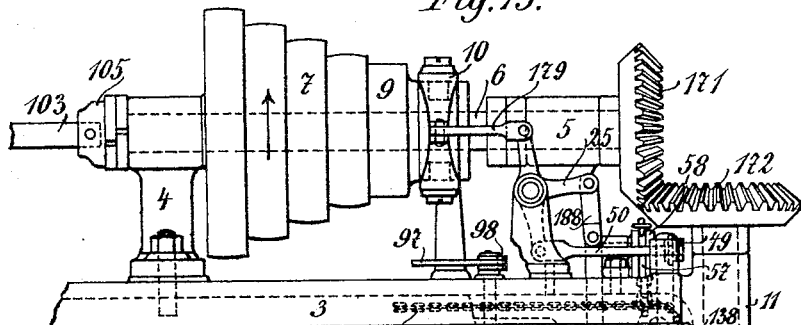
Fig. 13.
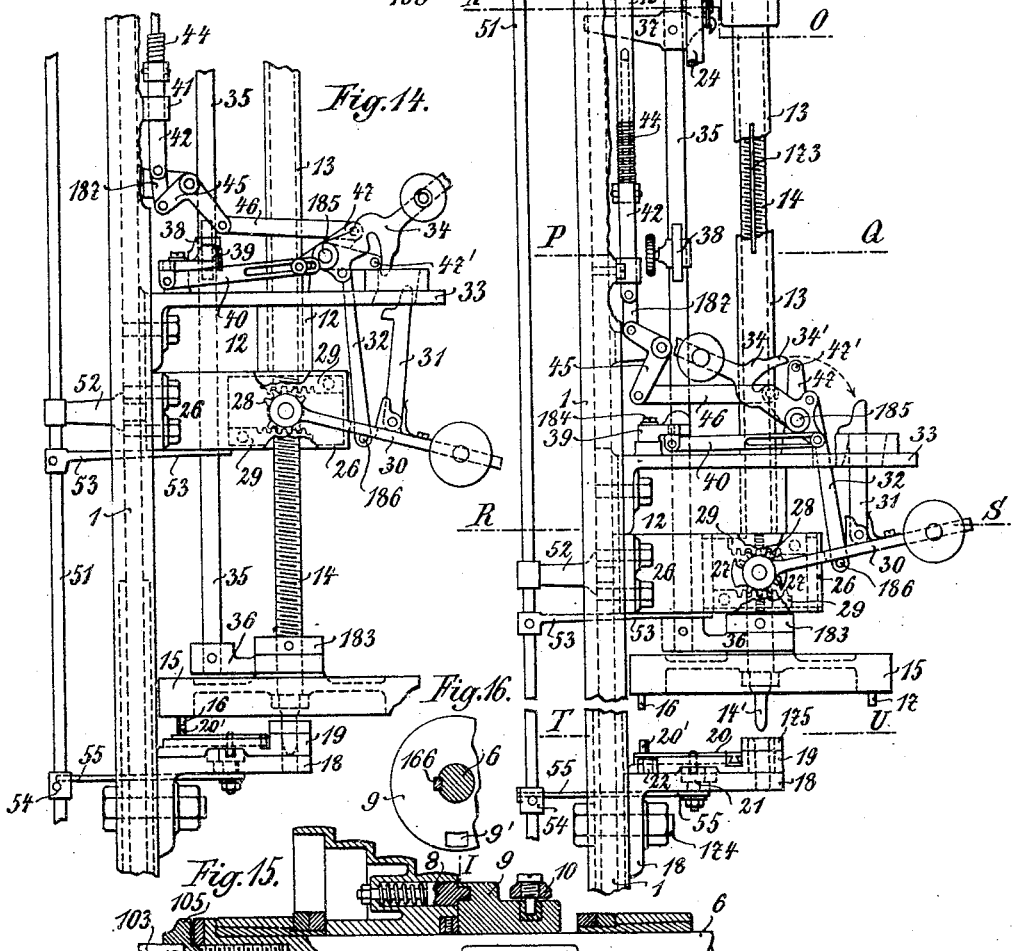
Fig. 14.
Fig. 16.
Fig. 15.
Witnesses:
Inventor
Otto Türke
By James L. Norris,
Atty.

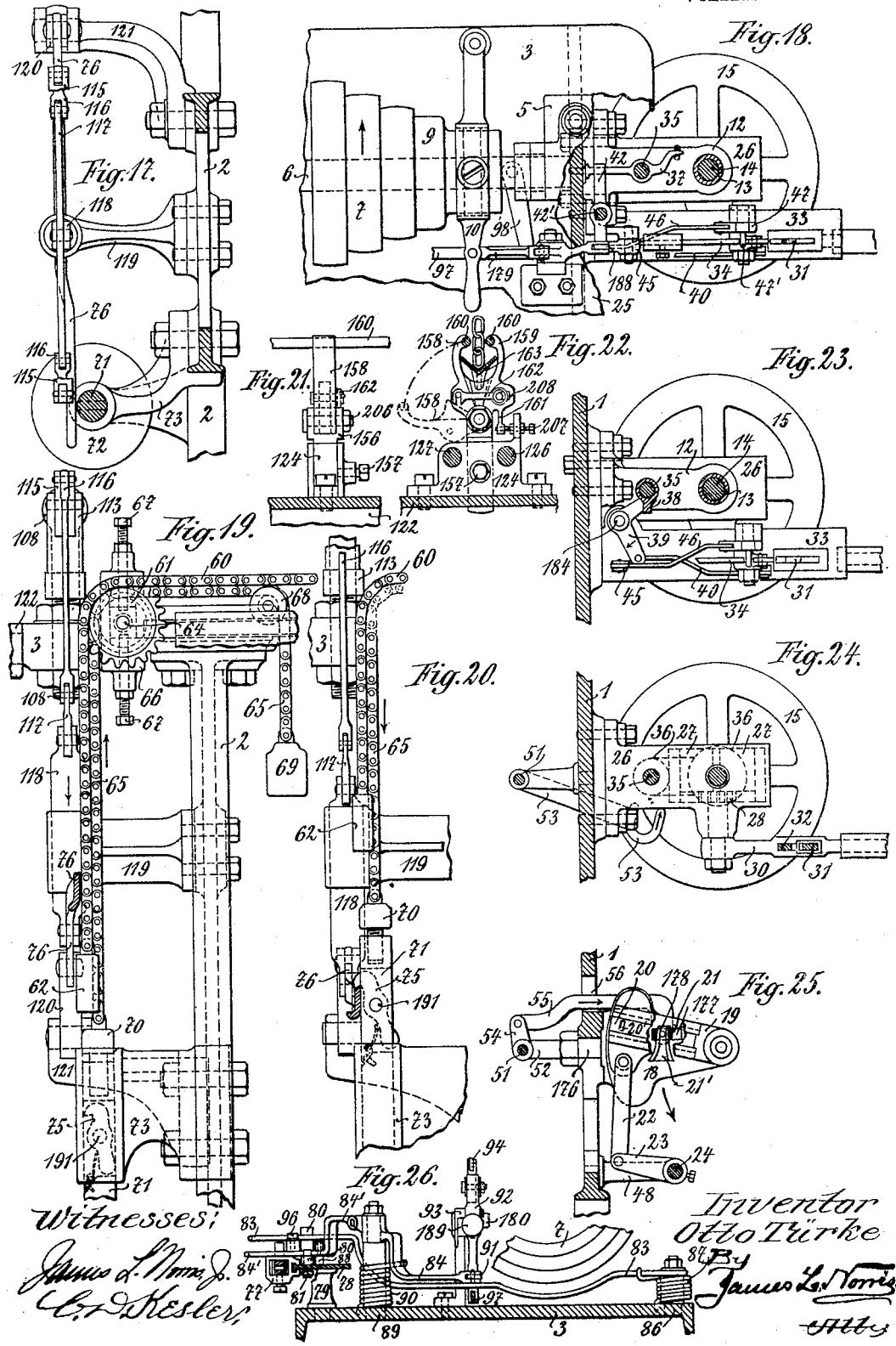

No. 803,941. PATENTED NOV. 7, 1905.
O. TÜRKE.
WIRE NETTING MACHINE.
APPLICATION FILED JULY 28, 1904.
7 SHEETS—SHEET 7.
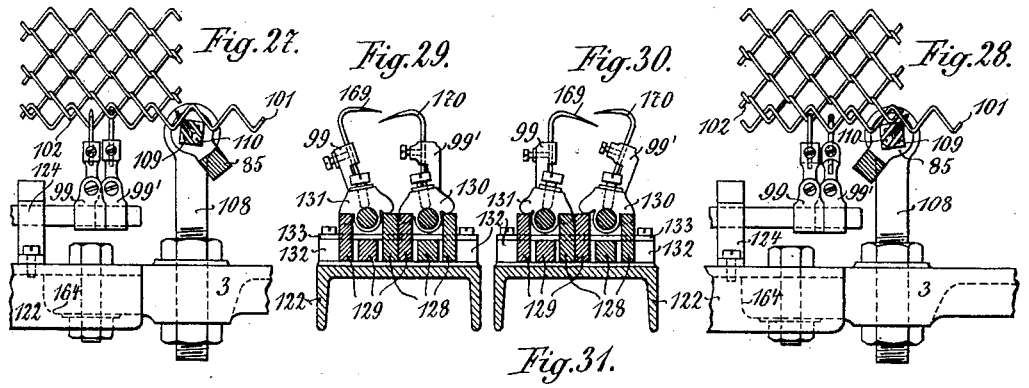
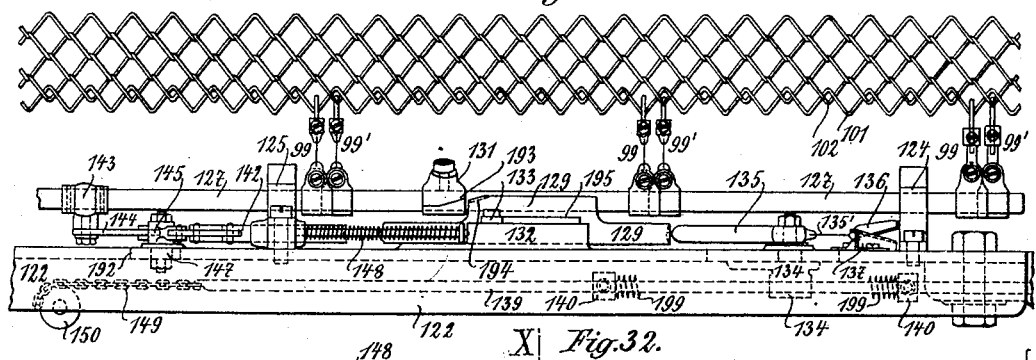
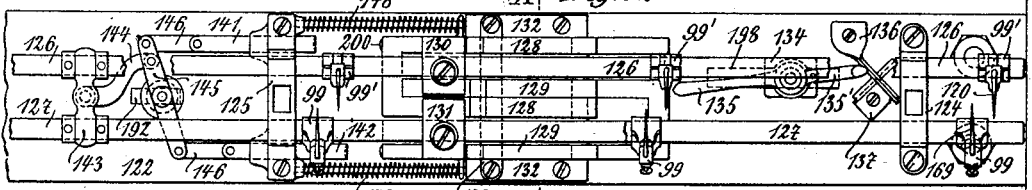
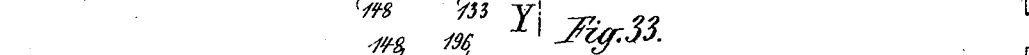
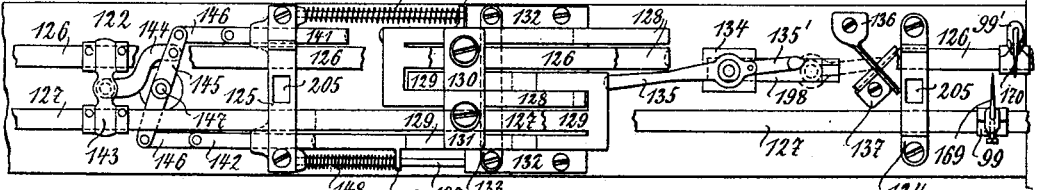
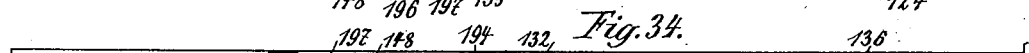
Witnesses:
Inventor
Otto Türke

UNITED STATES PATENT OFFICE.

OTTO TÜRKE, OF SAALFELD-ON-THE-SAALE, GERMANY.

WIRE-NETTING MACHINE.

No. 803,941.

Specification of Letters Patent.

Patented Nov. 7, 1905.

Application filed July 28, 1904. Serial No. 218,588.

*To all whom it may concern:*

Be it known that I, OTTO TÜRKE, a citizen of the Empire of Germany, residing at Saalfeld-on-the-Saale, in the Empire of Germany, have invented a new and useful Wire-Netting Machine, of which the following is a specification.

My invention relates to wire-netting machines of that kind in which the wire is zigzagged or bent in a zigzag line on a rotating blade with the aid of a spiral guide and on leaving the blade it proceeds and during its rotation it twists itself with the last row of loops of the fabric by consecutively engaging in the several meshes until its point arrives at the edge of the fabric, whereupon the machine is stopped and the wire is cut off at the other edge of the fabric.

My invention consists in improvements in such machines whereby the machine is enabled to perform all the operations automatically, so that the laborer can attend to several machines at a time.

The objects of my improvement are, first, to provide a screw-spindle for arbitrarily determining the number of revolutions of the working spindle carrying the blade and geared to the screw-spindle in accordance with the number of meshes in the width of the fabric to be produced; second, to provide means for automatically starting and stopping the working spindle for every row of loops; third, to provide a reversing wire-cutting device so arranged that its two knives cut the wire about at right angles thereto and in alternating inclined planes; fourth, to provide two rows of adjustable oscillating hooks adapted to alternately engage in the new row of loops for holding the fabric, which is drawn upward by its own weight or otherwise; fifth, to provide a mechanism for operating the two rows of oscillating hooks; sixth, to provide means for automatically shifting by the oscillating hooks the fabric in either direction through half the pitch of the meshes for each row of loops; seventh, to provide means for stopping the working spindle in the exact alternating positions set at one hundred and eighty degrees from each other; eighth, to provide means for actuating the two knives of the reversing wire-cutting device at the proper moment; ninth, to provide means for guiding the fabric and the rotating zigzagged wire; tenth, to provide weights to be raised by the screw-spindle during the rotation of the working spindle for actuating the various mechanisms during the stoppage of the working spindle, and, eleventh, to provide means for adapting the machine to the varying thickness of the wire and size of the meshes of the fabric. I attain these objects by the machine illustrated in the accompanying drawings, in which—

Figure 2:
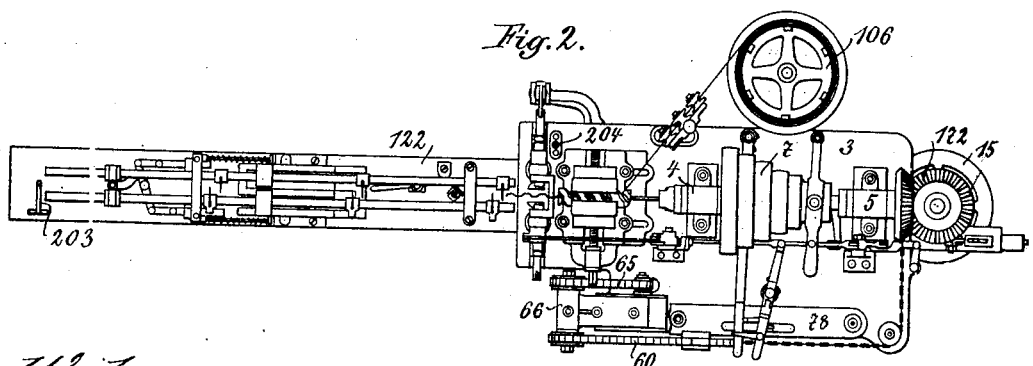
Figure 8:
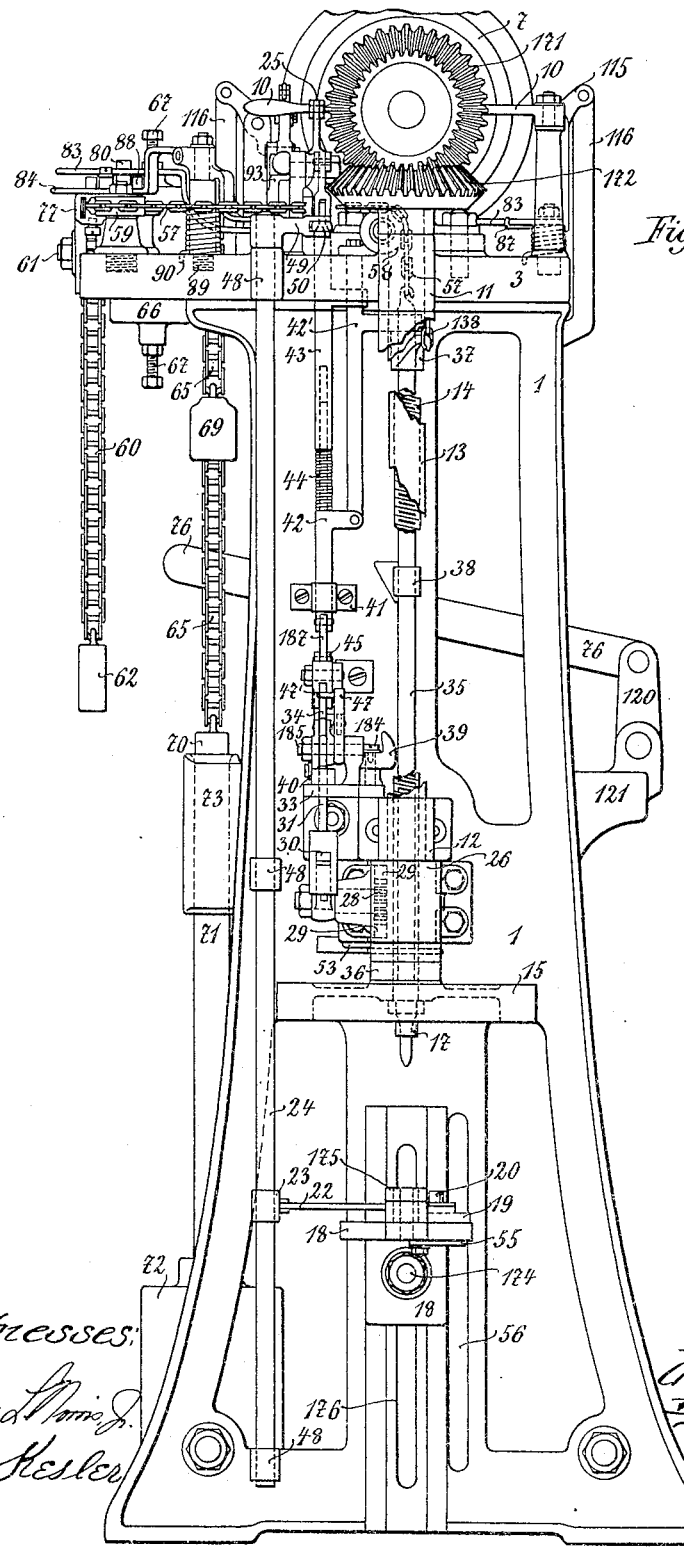

Figure 1 is an elevation of the entire machine and the fabric, an intermediate part of the fabric and the twisting-table being omitted. Fig. 2 is a plan of the same, the fabric being omitted and the fabric-supports shown in section. Fig. 3 is a plan, on an enlarged scale, of the machine part on the right, the one bevel gear-wheel 171 being omitted and parts of the other bevel gear-wheel 172 being broken away. Fig. 4 is an elevation of the upper part of the same, parts of the two chains 57 and 60 being broken away. Fig. 5 is a detail of the same, certain parts occupying the other extreme position. Figs. 6 and 7 show in elevation other details of Fig. 3, partly in section, which will be referred to later on. Fig. 8 is a side view, on an enlarged scale, of the machine seen from right to left in Fig. 1. Fig. 9 is a vertical cross-section, on the same scale, through the machine on the line A B in Fig. 1. Fig. 10 is an elevation, on the same scale, of part of the left part in Fig. 1. Fig. 11 is a horizontal section through the line C D in Fig. 10. Fig. 12 is a horizontal section through the line E F in Fig. 9. Fig. 13 is an elevation, on the same scale, of the upper right machine part in Fig. 1, certain parts being omitted and an intermediate part below being broken away. Fig. 14 is a part of Fig. 13 and shows certain parts in other positions, the intermediate part being inserted. Fig. 15 is a vertical longitudinal section through the line G H in Fig. 3 and shows the working spindle. Fig. 16 is a vertical cross-section through the line I K in Fig. 15. Fig. 17 is a horizontal section through the line L M in Fig. 9, the rods 116 116 and parts of the cam-levers 115 115 being shown in plan and the piston 71 in section. Fig. 18 shows, partly in plan and partly in horizontal section through the line N O in Fig. 13, a part of this figure. Fig. 19 is an elevation, on the same scale, of an intermediate part of the machine. Fig. 20 is a part of Fig. 19 and shows certain parts in other positions. Fig. 21 is an elevation, on the same scale, of part of the device for guiding the fabric and the zigzagged wire omitted from Figs. 31 to 34, inclusive, but of which the left part is shown at Fig. 10, the shafts 126 and 127 (see Fig. 22) and the trough 163 being omitted. Fig. 22 is a cross-section through this device. Fig. 23 is a horizontal section through the line P Q in Fig. 13. Fig. 24 is a horizontal section through the line R S in Fig. 13. Fig. 25 is a horizontal section through the line T U in Fig. 13, an intermediate part of the lever 19 and slide 20 being broken away. Fig. 26 is a vertical section through the line V W in Fig. 3. Fig. 27 is a vertical longitudinal section, on the same scale, through the wire-cutting device and shows in elevation part of the fabric, the right pair of oscillating hooks and parts of the twisting-table and the machine-table. Fig. 28 shows the same parts in other positions. Fig. 29 is a vertical cross-section through the twisting-table on the line X Y in Fig. 32 and shows a pair of oscillating hooks. Fig. 30 is the same vertical cross-section and shows the oscillating hooks in the other extreme positions. Fig. 31 is an elevation, on the same scale, of part of the twisting-table and the fabric. Fig. 32 is a plan of the same, the fabric being omitted and parts of the shafts broken away. Fig. 33 is the same and shows the parts in other positions; and Fig. 34 is the same as Fig. 32, certain parts being omitted to show the shape of the two pronged latches.

Similar characters of reference refer to similar parts throughout the several views.

The machine-frame on the right is composed of the two standards 1 and 2 and the table 3 conveniently bolted together. The twisting-table 122 of any convenient length on the left is bolted on a projection 164 of the table 3 (see Fig. 28) and on the left standard 123. The working spindle 6 (see Fig. 15) is mounted to turn in suitable bearings 4 and 5 and carries the driving-cone 7 and the clutch 9. The driving-cone 7 is loose on the spindle 6 and secured against shifting by the bearing 4 and a loose collar 165 with set-screw. The clutch 9 is longitudinally movable on the spindle 6, but prevented from turning by a spline 166. The driving-cone 7 is normally constantly driven, while the working spindle 6 requires to be started and stopped periodically. A friction-clutch would not do, as at times it may be difficult to disengage it, and an ordinary clutch-coupling would neither do for a mechanism of this nature. Therefore I have disposed in the driving-cone 7 a spring-pressed bolt 8, which is longitudinally movable and adapted to engage in a hole 9' of the clutch 9. Of course the bolt 8 might be disposed in the latter and arranged to engage in a hole in the cone 7. The clutch 9 can be engaged and disengaged by means of a lever 10 of a well-known construction and both by hand (see Fig. 18) and mechanically in a manner to be hereinafter described. The well-known blade 103 is secured in a chuck 105 and the latter, with its threaded shank, in the working spindle 6. By means of a counter-nut 167 this chuck 105 can be so adjusted that the blade 103 shall invariably assume its normal vertical position (shown at Figs. 3, 4, 13, and 15) on the working spindle 6 stopping. Thereby the zigzagged wire twisted with the last row of loops will be placed in the right vertical position in the latter and the wire-cutting device to be described later on will operate correctly. The blade 103 engages in the cylindrical bore of the well-known spiral guide 104, Figs. 3 and 4, and is therein guided during its rotation. The spiral guide 104 is in the usual manner secured in a parallel vise 168 of a known construction, which can be longitudinally adjusted on the table 3 by means of bolts engaging in slots, as is clearly shown at Fig. 3. The wire-reel 106 is mounted to turn on a suitable vertical pin supported by a convenient bracket (not shown) of the table 3 or otherwise. The wire passes from the reel 106 through a straightening device 107 of any known construction to the blade 103 and is bent thereon while being longitudinally shifted by the spiral slit in the guide 104.

Near the vise 168 two vertical threaded supports 108 (see also Figs. 9, 27, and 28) are adjustably secured on the table 3, and in their eyes a horizontal cranked shaft 85 is mounted to turn. Both parts of this shaft 85 have central square cavities in which the two knife-carriers 109 109 can slide. The internal ends of these carriers are forked and hold the knives 110 110 by means of pins. These knives are adapted to cut the wire shown in section at Fig. 9. Preferably they are left blunt on the lower parts of their cutting edges, so as not to damage each other, as these blunt parts serve as stops. The two supports 108 108 are embraced by two slotted angular brackets 113 113, which can be vertically adjusted by two set-screws 114 114 resting on the table 3.

In the upper forked ends of the two brackets 113 113 two cam-levers 115 115 are mounted to turn on pins and adapted to bear against the knife-carriers 109 109. The external ends of the latter are preferably provided with adjusting-screws 111 111 for adjusting the knives 110 110 to a nicety. Normally the knife-carriers 109 109 are pressed outward by two leaf-springs 112 112, secured on the brackets 113 113 and bearing against the heads of the adjusting-screws 111 111. By vertically adjusting the two supports 108 108 and the set-screws 114 114 the knives 110 110 can be adapted within certain limits to various sizes of the meshes of the fabric. The knives 110 110 are required to cut the wire about at right angles thereto, and as the inclination of the part of the zigzagged wire to be cut alternates for each row of loops it follows that the cranked shaft 85, with the knives, must be placed in the one inclined position shown at Fig. 27 for one row of loops and in the opposite inclined position shown at Fig. 28 for the following row of loops, then again in the first position for the third row of loops, and so on. For this reason the cranked shaft 85 requires to be periodically rocked by means of a lever 95 in a manner to be hereinafter described.

From an examination of Figs. 27 and 28 it will be evident that the fabric requires to be alternately shifted in either direction through a distance like half the width of the meshes—that is, through a fourth of this pitch—to either side from the center line of the cutting device or the supports 108. This is effected by the rocking hooks 169 170 (see Figs. 29 and 30) in a manner to be hereinafter described. It is, moreover, evident that this shifting of the fabric is also necessary for enabling the point of the zigzagged wire to consecutively engage in the several meshes of the last row of loops. It is further obvious that the working spindle 6 requires to be stopped in a certain position with the one narrow side of the blade 103 turned upward for cutting off the wire of one row of loops and in another position set at one hundred and eighty degrees to the first one—i. e., with the said narrow side of the blade turned downward for cutting off the wire of the following row of loops, then again in the first position for the third row of loops, and so on. The reason for this will be clear when taking into consideration that the lengths of all the various zigzagged wires in the fabric must be alike and that the cutting-point of the two knives 110 110 is alternately on the right and on the left side from the vertical center plane of the two supports 108 108. In other words, it travels to and fro through a distance equal to half the pitch of the meshes. This is effected in a manner to be hereinafter described.

The working spindle 6 is geared to a vertical hollow shaft 13, Figs. 4, 8, and 13, by means of two bevel gear-wheels 171 and 172 of equal diameter. The hollow shaft 13 is mounted to turn in two bearings 11 and 12, conveniently secured on the table 3 and the standard 1, respectively. Within the hollow shaft 13 a grooved screw-spindle 14 is arranged to slide longitudinally, while it is prevented from turning by a spline 173, secured in the hollow shaft 13 and engaging its longitudinal groove. Beneath the lower bearing 12 a bracket 26 is fastened on the standard 1 and formed to a casing in which the halves 27 27 of a nut (see Fig. 24) can slide. These halves are connected by two racks 29 29 and a pinion 28, so that by turning the latter in the one and other directions the nut can be made to engage the screw-spindle 14 and to disengage therefrom in a well-known manner. On the shaft of the pinion 28 is fastened a weighted lever 30, which will be referred to later on. A tappet-disk 15 is fastened on the lower end of the screw-spindle 14 and provided with two tappets 16 and 17, which are opposed to each other and disposed at slightly different radiuses from the center line. A bracket 18 (see also Fig. 8) can be vertically adjusted on the standard 1 by means of a bolt 174 engaging in a vertical slot 176 and is provided with a vertical hollow pin in the center line of the screw-spindle 14. On this hollow pin a lever 19 (see Fig. 25) is mounted to turn in a horizontal plane, while it is prevented from shifting upward by a loose collar 175 with set-screw. The bore of the hollow pin serves for guiding the lower thinner end 14' of the screw-spindle 14 in its lowermost position. The lever 19 has a radial groove of dovetailed cross-section, in which a slide 20 with a tappet 20' can glide. This tappet 20' is arranged for occupying either of two positions, so that in the one position it is in the path of the one tappet 16 on the tappet-disk 15, while in the other position it is in the path of the other tappet 17. In the bracket 18 is a slot 177, in which a slide 21, provided with a channel 21', can move. This channel 21' diverges to without and is adapted to catch and guide a pin 178 on the bottom of the slide 20. The lever 19 is pivotally connected by a link 22 with an adjustable lever 23 on the vertical shaft 24, which latter is mounted to turn in three bearings 48 48 on the standard 1 and in the table 3.

In Figs. 13 and 14 the parts 22, 23, and 24 are omitted for the sake of clearness, and only in the upper part of Fig. 13 a part of the shaft 24 is shown. On the upper end of this shaft 24 is fastened a lever 49, (see also Fig. 3,) which by a cranked rod 50 is pivotally connected with the lower arm of a three-armed lever 25. The upper arm of this lever is connected by a link 179 with the lever 10, already referred to above. The slide 21 is pivotally connected by a cranked link 55 with a short lever 54 on a vertical shaft 51. The standard 1 is provided with a vertical slot 56 for the passage of this cranked lever 55, so that the bracket 18 can be vertically adjusted. The shaft 51 is mounted to turn in suitable bearings 52, Figs. 13 and 14, and in the table 3. On its upper end is fastened a lever 98, which by a rod 97, Figs. 3, 4, 5, 18, and 26, is pivotally connected with the lower arm of a two-armed lever 92. The latter turns on a pin 180, secured on a support 93. The upper arm of the lever 92 is extensible in a manner clearly shown at Figs. 3 and 4 and is pivotally connected by a rod 94 with the lever 95 of the wire-cutting device already referred to above.

It will be seen that on the lower arm of the lever 92 being turned in either direction the rod 97 will be moved in the same direction, and by the parts 98, 51, 54, and 55 the slide 21 will be moved in the respective direction to shift the tappet 20' by its slide 20 and pin 178. The path of this tappet 20' being very small and the stroke of lever 92 very large, the left end of the rod 97 is slotted to reduce the motion thereby transmitted, and, moreover, the two levers 54 and 98 are conveniently proportioned. On the shaft 51 is fastened a lever 53, (see Figs. 13, 14, and 24,) the free end of which is forked and will be referred to later on. A vertical rod 35, (see Figs. 8, 13, 14, 18, 23, and 24,) parallel to the screw-spindle 14, is arranged to longitudinally move in the two brackets 12 and 26 and is suspended from a chain 57, led over two pulleys 58 and 59. This chain 57 is of the ordinary kind, since it requires to be moved in two planes at right angles to each other, and is connected with a Galle's chain 60, led over a chain-wheel 61 and tightened by a small counterweight 62. (See Fig. 9.) The chain-wheel 61 is fastened on the one end of a shaft 64, (see Figs. 3 and 4,) on whose other end a second chain-wheel 63 is fastened. Over this chain-wheel 63 and a guiding-pulley 68 a second Galle's chain 65 is led, which carries on the left end a heavy weight 72 and on the right end a small counterweight 69 for tightening it. The manner in which the weight 72 is connected with the chain 65 will be hereinafter described.

The ratio of the two chain-wheels 61 and 63 can be altered at pleasure by replacing either or both of them with other chain-wheels of different sizes. Thereby the stroke of the chain 65 can be increased and decreased, as may be required. The left part of the chain 65 of course requires to be maintained in the vertical center line of the positively-guided weight 72. The upper part of the chain 60 is to receive an adjustable tappet 77, which will be referred to later on, and is guided by the edge of a horizontal plate 78, Figs. 3 and 26, and therefore this part of the chain 60 requires to be maintained in its horizontal center line. For these reasons the shaft 64 of the two chain-wheels 61 and 63 requires to be vertically and horizontally adjustable. This is effected in the manner that the bearing of the shaft 64 is adapted to slide in a vertical slot of the bracket 66, Fig. 4, and can be adjusted by means of the two adjusting-screws 67 67 and counter-nuts, while the bracket 66 can be horizontally shifted and secured by two bolts 181 engaging in slots 182 of the table 3. The lower end of the vertical rod 35 is rigidly connected with an arm 36, which embraces the screw-spindle 14 at the tappet-disk 15 and is there secured against shifting by a loose collar 183 with set-screw. The screw-spindle 14 is thus coupled to the rod 35 and is adapted to take along with it the same, and thereby to raise the weight 72, while on being released by the nut-halves 27 27 it is raised, together with the rod 35, by the sinking weight 72.

On the upper end of the rod 35 is secured a cross-head 37, whose left arm is guided with its end in a vertical slot in the standard 1, Fig. 13, while the right arm of this cross-head 37 is connected with a weight 155, Figs. 2, 9, and 10, by a chain 138, (see also Fig. 4,) led over a suitable pulley, a rod 139, Fig. 31, a chain 149, led over a pulley 150, and a rack 151. It will be seen that the screw-spindle 14 is also adapted to raise the weight 155 on going downward. The right arm of the cross-head 37 is cranked (see Fig. 18) to leave space to the chain 138 for moving on the side of the vertical part of the chain 57. The weights 72 and 155, also 62 and 69, may be so arranged in any known manner that they can be made heavier or lighter, as the circumstances may require it.

On the standard 1 is secured a bracket 33 beside the bracket 12 and provided with a vertical pin 184, on which a bell-crank lever 39 is mounted to turn. The one arm of this lever 39 is curved upward and shaped as a cam, (see Fig. 8,) against which an adjustable cam 38 on the rod 35 is adapted to strike. The other arm of the bell-crank lever 39 is pivotally connected by a cranked rod 40 with the lower arm of a peculiarly-shaped weighted locking-lever 34, which is mounted to turn on a horizontal pin 185, secured on a projection of the bracket 33. The right part of the rod 40 is slotted to leave a certain play to the pin on the lower arm of the lever 34. Another short arm of this lever 34 is pivotally connected with a rod 32, which passes through slots of the bracket 33 and the already-mentioned weighted lever 30, respectively, (see Fig. 24,) and is provided with a pin 186, on which the lever 30 rests. A spring-pressed hook 31 is hinged to a convenient projection of the lever 30 and moves with its upper end in a slot of the bracket 33. It is adapted to snap over the top face of the slot under the action of its leaf-spring on the weighted lever 30 being raised. A hooked projection 34' of the locking-lever 34 is adapted to strike against the upper end of the hook 31, and thereby release it from the bracket 33 on the lever 34 being turned in the direction of the arrow in Fig. 13. On the pin 185 is mounted loosely a bell-crank lever 47, the one arm of which is provided with a pin 47', while the other arm is pivotally connected by a cranked rod 46 with the lower arm of a second bell-crank lever 45. The pin 47' has normally a certain play within the recess of the locking-lever 34 beneath its hooked projection 34' for both extreme positions of the locking-lever 34 and the bell-crank lever 47. (See Figs. 13 and 14.)

The horizontal arm of the bell-crank lever 45 is by a link 187 connected with a T-piece 42, which is adapted to vertically move in a guide 41 (see Fig. 8) and in the bore of a rod 43. The latter is on its upper part guided by a hole in the table 3 and connected by a link 188 with the horizontal arm of the three-armed lever 25, already referred to above.

Between the rod 43 and the shoulder of the T-piece 42 a helical spring 44 is inserted, the purpose of which will be explained later on. The horizontal arm of the T-piece 42 is rigidly connected with a second T-piece 42', whose upper part is guided in the hole of a lateral projection of the rod 43, while the horizontal arm can be struck against and raised by the left arm of the cross-head 37, (see Figs. 8, 13, and 18,) referred to above.

As already mentioned above, the wire-cutting device requires to alternately occupy two different positions, Figs. 27 and 28. It is to be rocked in either direction on the screw-spindle 14 going downward—i. e., in the one direction and by means of the adjustable tappet 77 on the chain 60. This is effected in the following manner: On the table 3 is secured a vertical stud 89, (see Fig. 26,) formed on the upper part to a pin on which a two-armed lever 84 84' is mounted to turn. A helical spring 90 surrounds the stud 89 and presses the arm 84 in the direction of the hands of a watch in Fig. 3. This arm 84 is cranked and pivotally connected by a rod 91 with the lower arm of the two-armed lever 92, above the rod 97 referred to above. The support 93 is provided with an adjusting-screw 189 for limiting the motion of the lever 84 under the action of its spring 90. The arm 84' is hinged to its nave and is equally cranked. It rests by its own weight on a cam-shaped plate 80, (see Figs. 4, 5, 6, and 7,) which is fastened on the guiding-plate 78. The arm 84' may also be loaded by a special weight, (not shown,) if this should be necessary. The guiding-plate 78 is secured on two supports 79 79 and provided with a hole in which a latch 81 can slide vertically, while it is pressed upward by a spring 82. The upper end of the latch 81 is so shaped that the arm 84' can depress it on being moved from left to right, while the latch 81 snaps upward on the arm 84' leaving it. (See Fig. 7.) On the table 3 is fastened another stud 86, Fig. 26, formed on the upper end to a pin on which a long cranked lever 83 can turn horizontally and a little upward. A helical spring 87 surrounds the stud 86 and presses the lever 83 from right to left, so that the latter normally bears against the projection 80' of the cam-shaped plate 80. In this position it is placed so high that the upper nose 77' of the tappet 77 can pass beneath it. (See Fig. 7.) A turnable cam 88 of the shape shown at Fig. 6 is connected with the lever 83 and adapted to slide on the guiding-plate 78. An elastic hook 96 is secured on the arm 84' and adapted to grip the lever 83.

When the two levers 83 and 84 84' and the wire-cutting device, with the parts 94, 92, and 91 connected therewith, are assumed to occupy the position shown at Figs. 3 and 4, the tappet 77 will move in the direction from left to right on the screw-spindle 14 going downward. It passes beneath the lever 83, strikes with its right face against the arm 84', Fig. 7, and takes the same along with it while depressing the latch 81, thus reversing the two-armed lever 92, (see Fig. 5,) and thereby also the wire-cutting device. Meanwhile the arm 84' has taken along with it by its elastic hook 96 the lever 83, which owing to its own weight slides down the cam-shaped plate 80 and is supported by its cam 88 on such a height, Figs. 5 and 6, that it nearly touches the top face of the tappet 77, but not the nose 77' of the latter. The latch 81 having snapped upward holds the two levers 83 and 84 84' in the positions indicated by the dotted lines at Fig. 3 while the screw-spindle 14 is being raised and the chains 57 60, with the tappet 77, are moved from right to left by the weights 72 and 155. On the screw-spindle 14 again going downward the nose 77' of the tappet 77 will strike against and take along with it the lever 83, with the cam 88, so that the latter raises the arm 84', thereby releasing it from the latch 81. Then the spring 90 will turn back the lever 84 84' into the initial position shown in full lines at Fig. 3, and thereby also reverse the lever 92 and the wire-cutting device.

At the time that the lever 92 is in returned position, as above stated, the lever 83 is extended a little over the position indicated by dotted lines in Fig. 3, whereby this lever by means of the curved disk 88 guided toward it raises the lever 84' up over the inclines 81, and therefore releases the spring 90. Immediately afterward the screw-spindle 14 is released and raised by the two said weights, so that the tappet 77 is moved to the left and the lever 83 by its spring 87 is returned to its initial position.

It is obvious that by adjusting the extensible arm of the lever 92 its stroke can be varied, and thereby the wire-cutting device adapted to the varying pitch of the fabric meshes.

The two above-mentioned cam-levers 115 115 of the wire-cutting device, Figs. 9, 17, and 19, are pivotally connected by two rods 116 116 with a cross-head 117 and the latter with a piston 118, guided in a bracket 119 on the standard 2. The lower end of the piston 118 is pivotally connected with a lever 76 and the latter at its rear end by a link 120 with a bracket 121 on the standard 2. This lever 76 is normally held in its upper position (shown at Fig. 9) by a helical spring 76', attached to the standard 2. Then the two knives 110 110 are withdrawn by the two leaf-springs 112 112 to leave free space for the zigzagged wire. It is evident that on depressing the lever 76 with the hand the two knives 110 110 will approach each other and cut the wire. The lever 76 can also be actuated mechanically in the following manner:

The weight 72, referred to above, is fastened on the lower end of a rod 71, which may be made hollow on its lower half and guided by a vertical rod 74 engaging in its bore. This rod 74 may be longitudinally grooved to prevent the weight 72 from turning by a conveniently-placed spline 190. (See Fig. 12.) The rod 71 is connected with the chain 65, referred to above, and, preferably, by means of an adjusting-screw 70, Fig. 20. The upper part of the rod 71 is guided in a bracket 73 on the standard 2 and provided with a slot 71, in which a spring-pressed pawl 75 is arranged to turn on a pin 191.

When the weight 72 occupies its lowermost position, the pawl 75 will be within the guide 73 and in the position shown at Fig. 19. When the weight 72 with its rod 71 rises, the slot 71 will be uncovered, so that the pawl 75 under the action of its spring projects to the left. During the further upward motion this pawl 75 strikes against the rounded bottom edge of the lever 76, and is thereby turned back until it rises above the lever 76 and again projects. On the weight 72 sinking the pawl 75 will soon grip the lever 76 and depress it, thereby actuating the wire-cutting device. The bore of the guide 73 is beveled off at the upper edge on the place where the lower arm of the pawl 75 will strike against the bracket 73. (See Fig. 20.) Thereby during the downward motion of the rod 71 the pawl 75 will be turned back to release the lever 76, which will then return to its initial position above. By adjusting the screw 70 the pawl 75 can be made to release the lever 76 at the proper moment.

On the twisting-table 122 several crosspieces 124 125 are secured, in which two parallel shafts 126 and 127, Figs. 31, 32, 33, and 34, are mounted to turn. These shafts have clamped on them two series of hook-carriers 99 and 99' with adjustable hooks 169 and 170. (Shown at Figs. 29 and 30.) By means of a cross-head 143, secured between two loose collars with set-screws on each shaft, the two shafts 126 and 127 can be simultaneously and longitudinally shifted, while they are allowed to rock. The cross-head 143 is connected by a cranked link 144 with a two-armed lever 145, rocking on a pin 147, which latter can be adjusted in a longitudinal slot 192 in the twisting-table 122. The two arms of the lever 145 are connected by links 146 146 with two bolts 141 and 142, adapted to longitudinally slide in the cross-piece 125. On the two shafts 126 and 127 are fastened two rockers 130 and 131, respectively, which have inclined faces 193, (see Fig. 31,) adapted to work alternately with the corresponding inclined faces 194 of two three-pronged latches 128 and 129. (See Fig. 34.) The latter are mounted to move longitudinally in suitable recesses of a crosspiece 132, secured on the table 122, and are provided with slots 195, Fig. 31, in their external higher prongs. Through these slots 195 passes a cross-bar 133, which is secured on the cross-piece 132, so that the two three-pronged latches 128 and 129 are thereby prevented from jumping. The external prongs of the latches 128 129 are provided with projections 196 196, which are perforated for the passage of two rods 197 197, secured between the two cross-pieces 125 and 132. Two helical springs 148 148 surround the two rods 197 197 between the projections 196 196 and the cross-piece 125 and tend to return the two latches 128 and 129 to their initial positions. (Shown at Fig. 34.) The table 122 is provided with a longitudinal slot 198, in which a slide 134 can glide. This slide 134 is also adapted to move on the rod 139 already referred to above and is at the top formed to a pin, around which a controller 135 can turn. This controller 135 is adapted to push alternately the two latches 128 and 129 from right to left and is provided with an elastic arm 135', which is normally horizontal. The two latches 128 and 129 are provided with suitable recesses 128' and 129', respectively, in which the point of the controller 135 can alternately engage. Two guides 136 and 137 are so secured on the twisting-table 122 as to cross each other about at right angles. (See Figs. 32 to 34.) The lower edge of the one guide 136 is inclined upward and bent to a flange, which is adapted to catch the point of the elastic arm 135' (see Fig. 32) and to guide it upward on the controller 135, being moved from left to right by means of the rod 139 and the left collar 140. Thereby the controller 135 is turned from its one extreme position shown to the opposite extreme position, so that its point can engage in the recess 128' of the other latch 128 on it being moved from right to left, when the point of the elastic arm 135' will slide off the flange of the guide 136 and the arm 135' will return to its normal horizontal position. The upper edge of the other guide 137, on the contrary, is inclined downward and bent to a flange which is adapted to catch the point of the elastic arm 135' and to guide it downward, whereby the controller 135 is reversed, as is indicated by the dotted lines at Fig. 33. To avoid shocks, two spiral springs 199 199 are preferably placed on the rod 139, Fig. 31, between the slide 134 and the two adjustable collars 140 140. The left collar 140 is so adjusted that the controller 135 is moved to the right only as far as is required to reverse it. The right collar 140, however, is so adjusted to enable the controller 135 to push either of the two latches 128 and 129 to the left through a certain invariable distance. The two latches 128 and 129 are provided with two rounded projections 200 and 201, respectively, which are adapted to alternately engage in corresponding recesses at the right ends of the two bolts 141 and 142, and thereby to transmit the motion of the controller 135 to the two shafts 126 and 127. The stroke of the two latches 128 and 129 is greater than that of the lever 145, seeing that spaces are left between the latches and the two bolts 141 142. As the pitch of the fabric to be produced varies, the two shafts 126 and 127 require to be shifted through a variable distance equal to half the respective pitch. The adjustment of this variable stroke is effected by conveniently shifting the pin 147 in the slot 192. The nearer this pin 147 is placed to the cross-piece 125 the larger will be the stroke of the two shafts 126 and 127, while this stroke will be in proportion reduced the farther off the pin 147 is.

As will be seen from Fig. 33, the external higher prongs of the two latches 128 and 129 are so disposed (see Figs. 29 and 30) that those of the one latch 128 on moving from right to left engage the rear cams of the two rockers 130 and 131 and turn the latter to the front, Fig. 29, and on moving from left to right release the rear cams and allow the two rockers to turn back. The external higher prongs of the other latch 129 on moving from right to left engage the front cams of the two rockers 130 and 131 and turn the latter to the rear, Fig. 30, and on moving from left to right release the front cams and allow the two rockers to turn forward. The two shafts 126 and 127, with their hook-carriers 99′ 99 and hooks 170 169, are nearly simultaneously rocked in either direction, so that first the one row of hooks 169 engages in the meshes of the new row of loops and then shortly afterward the other row of hooks 170 releases the last row of meshes, and vice versa. This order of succession of the alternating rows of hooks is preserved by conveniently arranging the inclined faces 194 of the two latches 128 and 129, which can be determined by trials. The fabric is led over a horizontal guiding-roller 202, which can be vertically adjusted on the two cranked supports 203 and 204, as usual. Thus the fabric is normally held in a vertical plane above the twisting-table 122, and on the rear it is preferably led off in an inclined plane by a suitable roller or otherwise, so that it is on the front normally drawn upward by its own weight or special or additional weights, as the case may be.

It will be obvious that on the last row of loops being released by the respective hooks the fabric will automatically move upward and tighten the new row of loops.

The two hook-carriers 99 and 99′ in the proximity of the wire-cutting device (see Figs. 27 and 28) are rigid, but all the other hook-carriers 99 and 99′ (see Fig. 31) are elastic, so as to easily yield to the right or to the left. This is necessary to enable the hooks to adapt themselves to the slight variations in the several rows of loops produced by the varying tension of the wire while being bent on the blade 103, the consecutive new rows of loops constantly varying a little in the length.

For guiding both the fabric and the zig-zagged wire leaving the blade 103 and for enabling the point of the wire to properly engage in the several meshes of the last row of loops of the fabric the following device is provided: The several cross-pieces 124 125 124 on the twisting-table 122 (see Figs. 10, 21, 22, 31, 32, 33, and 34) are provided with central holes 205 205, in which the stems of a corresponding number of forks 156, Figs. 21 and 22, are vertically movable and can be secured by the adjusting-screws 157. On the pin 206 in every fork 156 two levers 158 and 159 are mounted to turn independently of each other, while they can be connected by means of a turnable hook 162. The rear lever 159 is provided with a lower arm 161, in which engages a set-screw 207, held by a lug of the cross-piece 124 or 125. Thereby the lever 159 can be adjusted in its position with regard to the fabric. The front lever 158 has a central rib (clearly shown at Fig. 22) which engages between two ribs on the rear lever 159, so that a supporting-face is thereby formed on which a trough 163 (see Fig. 10) can rest. This trough 163 is prevented from longitudinally shifting by its two lugs reaching over the two ribs of the rear lever 159. On the right end the trough 163 is widened out, so as to catch the point of the zigzagged wire and safely guide the latter. The trough 163 is in its middle provided with a convenient adjusting-screw or the like, whereby it can be vertically adjusted in accordance with the size of the meshes. The relative position of the two levers 158 and 159 can be altered by means of a slot 208 in the lever 159, in which the pivot of the hook 162 can be adjusted. All the rear levers 159 are connected with a common horizontal rod 160 behind the last row of loops, and all the front levers 158 are in a similar manner connected with a common horizontal rod 160 before the last row of loops. Thus two parallel rails are formed for holding the fabric in its vertical position while permitting the consecutive rows of loops to pass upward between them.

It will be seen that the point of the zigzagged wire will during the rotation of the working spindle 6 describe a spiral line and consecutively engage in the several meshes of the last row of meshes, while being in general safely guided between the two rails 160 160 and the several troughs 163 163. The device described so far has been omitted from Figs. 27 to 34, inclusive, for the sake of clearness.

The rack 151, (see Fig. 10,) already referred to above and connected with the weight 155, is preferably guided in a bracket 152 on the left standard 123. The pinion 153 (see also Fig. 11) engaging this rack 151 is shown as made in one piece with its shaft, which is mounted to turn in the bracket 152 and carries on the front end a fly-wheel 154, which will be referred to later on.

The wire-netting machine is operated as follows: According to the number of meshes in the width of the fabric to be produced the bracket 18, Figs. 13 and 14, is conveniently adjusted on the standard 1 to determine the stroke or travel of the screw-spindle 14, so that the latter on going downward exactly makes a number of revolutions equal to that of the meshes before its respective tappet 16 or 17 strikes against the tappet 20' on the lever 19. It is obvious that the stroke or travel of the screw-spindle 14 is equal to the corresponding number of its threads. The cam 38 is so adjusted on the rod 35 as to actuate the bell-crank lever 39 at the proper moment for disengaging the nut-halves 27 27 from the screw-spindle 14, as will be explained hereinafter. The chuck 105 is so adjusted in the working spindle 6 with the aid of the counter-nut 167 that the blade 103 assumes a vertical position on the working spindle stopping. Normally the screw-spindle 14 occupies its uppermost position. (Shown at Fig. 13.) The weighted locking-lever 34 is turned over to the left, so that the two nut-halves 27 27 engage the screw-spindle 14. The wire is placed on the reel 106 and in the usual manner passed through the straightening device 107 and the spiral guide 104, Fig. 3. To simplify the description, it is further assumed that the first zigzagged wire has already been engaged by the front row of hooks 169 169, Fig. 33, cut off by the wire-cutting device in the position shown at Fig. 27, and is now drawn upward in any known manner to form the first row of loops of the fabric. The driving-belt is placed on the convenient step of the cone 7, and the latter is started in the direction of the arrow shown at Fig. 13. Now the lever 10 is moved by hand from right to left to couple the clutch 9 with the driving-cone 7, and thereby to start the working spindle 6. In the motion of the lever 10 also the three-armed lever 25 partakes, so that by its lower arm, the link 50, the lever 49, the shaft 24, the lever 23, and the rod 22 the lever 19 is brought into the position shown at Fig. 25. The wire will now be bent on the blade 103 in a zigzag line and while describing a spiral line proceed from right to left over the twisting-table 122. By the two bevel-gears 171 and 172 the hollow shaft 13, with the screw-spindle 14, is rotated in the proper direction, so that the latter goes downward and by the rod 35 and the cross-head 37 raises the two weights 72 and 155 in the manner described above. On the tappet-disk 15 reaching a certain position above the bracket 18 the tappet 77 on the chain 60 will strike against the lever-arm 84', and thereby move the rod 91 to the left and turn the wire-cutting device to the right, as is shown at Fig. 28. Then by means of the rod 97, the lever 98, the shaft 51, the lever 54, and the cranked link 55 the slide 21 will be shifted to the right and take along with it the slide 20, with the tappet 20', so that the latter is brought into a position for engaging with the tappet 17 on the tappet-disk 15. At the same time the forked lever 53, Fig. 24, is withdrawn from the rod 35. Meanwhile the pawl 75 in the rod 71, Fig. 19, will have risen so much above the lever 76 to be ready for gripping it. The cam 38 strikes against the cam-arm of the bell-crank lever 39 and turns the latter so as to move by the rod 40 the weighted locking-lever 34 from the position shown at Fig. 13 into its vertical position without actuating at all the bell-crank lever 47 nor the weighted lever 30, since the rod 32 simply passes downward through the slot of the lever 30 and the latter is still supported by its hook 31 resting on the top face of the bracket 33. Meanwhile the thin end 14' of the screw-spindle 14 engages in the bore of the bracket 18, whereby the tappet-disk 15 is prevented from moving aside on its tappet 17 striking against the tappet 20' and turning the lever 19 in the direction of the arrow in Fig. 25. The cam 38 is so adjusted on the rod 35 that it turns the weighted locking-lever 34 just beyond its vertical position before the tappet 17 strikes against the other one 20'. Then the locking-lever 34 under the action of its weight will first slowly move and then be accelerated in turning downward in the direction of the arrow in Fig. 13 to release the hook 31 from the bracket 33, whereupon the weighted lever 30 drops and suddenly disengages the two nut-halves 27 27 from the screw-spindle 14, (see Fig. 14,) which is now set at liberty. At the same time the locking-lever 34 has gripped the pin 47', and thereby taken along with it the bell-crank lever 47, the rod 46, the bell-crank lever 45, and the link 187 and moved the two T-pieces 42 and 42' downward. The tappet-disk 15 is stopped by its tappet 17 striking against the tappet 20' on the now reversed lever 19. The motion of this lever 19 is transmitted by the link 22, the lever 23, the shaft 24, the lever 49, and the link 50 to the three-armed lever 25, so that by the link 179 and the lever 10 the clutch 9, with the working spindle 6, is disengaged from the driving-cone 7. At the same time by the horizontal arm of the three-armed lever 25 and the link 188 the rod 43 is lowered. The pause during which the locking-lever 34 moves before striking against and releasing the hook 31 from the bracket 33 can be so regulated that under all circumstances the working spindle 6 is disconnected from the driving-cone 7 and stops before the screw-spindle 14 is liberated from the two nut-halves 27 27. It will be evident that by the tappet 20' the screw-spindle 14 is stopped in a certain position, and thereby also the working spindle 6, so that the blade 103 is exactly vertical, and therefore the zigzagged wire in the proper position to be cut by the knives 110 110. Shortly before this moment also the controller 135 has been moved by the left collar 140 on the rod 139 to the right, so that its elastic arm 135' has been bent upward by the guide 136 and at the same time the controller 135 reversed, so that it is ready to engage in the recess 128' of the pronged latch 128. As the screw-spindle 14 is released from the nut-halves 27 27 it is at once raised by the two weights 72 and 155 with the aid of the rod 35. The tappet 77 releases the lever-arm 84' and moves to the left, while the latter is at once checked by the latch 81. The right collar 140 on the rod 139 takes along with it the slide 134, so that the controller 135 engages in the recess 128' of the pronged latch 128 and pushes the latter to the left, so that first the rear hooks 170 170 engage in the new row of loops, and then the front hooks 169 169 withdraw from the last row of loops, whereupon the fabric moves upward and tightens the new row of loops. At this moment the pawl 75 takes along with it the lever 76, whereby the wire-cutting device is actuated and the wire cut. Then the pawl 75 is turned back to release the lever 76, which returns to its initial position, so that the two knives 110 110 are withdrawn by their leaf-springs 112 112 to leave space for the zigzagged wire and the fabric. Shortly afterward the pronged latch 128 during its motion to the left strikes against the bolt 141, and thereby shifts the two shafts 126 and 127 with all the hook-carriers 99' 99, the hooks 170 169, and the fabric to the left through a distance equal to half the pitch of the meshes. This shifting requires a considerable force, and the weight 155 alone would not be able to perform this operation. For this reason the rack 151 has been inserted between the chain 149 and the weight 155 to put into rotation the fly-wheel 154, whose live force is then utilized for successfully carrying out the operation. At last the cross-head 37 on the rod 35 strikes against the horizontal arm of the T-piece 42', and thereby raises the other T-piece 42 while compressing the spiral spring 44. By the T-piece 42, the link 187, the bell-crank lever 45, and the cranked rod 46 the other bell-crank lever 47 is turned to the left to throw over the weighted locking-lever 34 to its initial position, so that in the manner described above by the rod 32 the nut-halves 27 27 are engaged in the screw-spindle 14. Now the compressed spiral spring 44 again extends and pushes the rod 43 upward, thereby turning the three-armed lever 25 to couple by the clutch 9 the working spindle 6 with the driving-cone 7 and to return the lever 19 to its initial position by means of the shaft 24. By conveniently adjusting the cross-head 37 on the rod 35 and the weights 72 and 155 the nut-halves 27 27 can be made to engage under all circumstances the screw-spindle 14 exactly at the moment when it has returned to its initial position. The speed of the working spindle 6 is in general invariable when once the belt has been placed on the respective step of the cone 7 in accordance to the thickness of the wire and the size of the fabric. When the working spindle 6 is disengaged from the driving-cone 7, the speed of the screw-spindle 14, moving upward under the action of the two weights 72 and 155, on the contrary, can be varied within certain limits by conveniently increasing and decreasing the weights. Now that the working spindle 6 is started, of course the screw-spindle 14 will again go downward. There is, however, a circumstance to be now taken into consideration. As stated above, the wire-cutting device is about to be reversed into the position shown at Fig. 27, which means that the cutting-off point will be shifted to the left through a distance equal to half the mesh-pitch and that the blade 103 requires to be stopped for the cutting operation in a position set at one hundred and eighty degrees to the previous one, so that the one narrow side of the blade 103 previously upward must now be turned downward in accordance with the alternating bends in the zigzagged wire. Consequently the screw-spindle 14 requires to be stopped at a distance equal to half its pitch beneath the previous uppermost position and the tappet-disk 15 in a position set at one hundred and eighty degrees to the previous one. This is effected with the aid of the two levers 53 and 54. (See Figs. 24 and 25.) The forked end of the lever 53 has a thickness equal to half the pitch of the screw-spindle 14 and is adapted to engage between the bracket 26 and the nave of the arm 36 (see Figs. 13 and 14) for reducing the upward stroke of the screw-spindle by half its pitch. This is correct, seeing that the cutting-off point of the wire-cutting device will be advanced through half a mesh pitch from right, Fig. 28, to left, Fig. 27, while the length of the zigzagged wire to be cut off remains the same as before. By the forked lever 53 also the two nut-halves 27 27 are enabled to at once and correctly engage in the screw-spindle 14 before the working spindle 6 is started. The new zigzagged wire proceeds from the spiral guide 104 to the left over the twisting-table, while its point describes a spiral line and consecutively engages in the several meshes of the last row of meshes. On the tappet-disk 15 reaching the position already referred to above near the bracket 18 the nose 77' of the tappet 77 on the chain 60 strikes against the lever 83, which in the previous operation had been taken along with by the elastic hook 96 on the lever-arm 84', now checked by the latch 81 in the position indicated by dotted lines at Fig. 3. The nose 77' moves farther the lever 83 and by its cam 88 releases the lever-arm 84' from the latch 81, whereupon the spring 90, Fig. 26, returns the lever 84 to its initial position, (shown in full lines at Fig. 3,) and thereby reverses the wire-cutting device to the left into the position shown at Figs. 4 and 27. Then by means of the rod 97, the lever 98, the shaft 51, the lever 54, and the cranked link 55 the slide 21 will be shifted from right to left, so as to bring the tappet 20' into the path of the other tappet 16 on the tappet-disk 15. At the same time the forked lever 53 is turned in the direction of the arrow in Fig. 24 to embrace the rod 35 and engage between the bracket 26 and the nave of the arm 36. Meanwhile the pawl 75 in the rod 71, Fig. 19, will have risen so much above the lever 76 as to be ready for gripping it. The cam 38 strikes against the cam-arm of the bell-crank lever 39 and turns the latter to move by the rod 40 the weighted locking-lever 34 to the right for withdrawing the nut-halves 27 27 from the screw-spindle 14. The T-piece 42 is moved downward by the locking-lever 34. The tappet-disk 15 has been stopped by its tappet 16 striking against the tappet 20' on the thereby reversed lever 19. The latter has at the same time by the parts 22, 23, 24, 49, and 50 reversed the three-armed lever 25, so that the working spindle 6 is disconnected from the driving-cone 7 by the lever 10. At this moment the blade 103 is again exactly vertical in a position set at one hundred and eighty degrees to the previous one, and the zigzagged wire is in the right position to be cut, as explained above, also shortly before the controller 135 has been moved by the left collar 140 on the rod 139 to the right, so that its elastic arm 135' has been bent downward by the other guide 137, and thereby the controller 135 reversed, so that it is ready to engage in the recess 129' of the other pronged latch 129. (See Fig. 34.) It is here to be remarked that during the downward motion of the screw-spindle 14 the first pronged latch 128 has been released by the controller 135 and returned to its normal position by the respective spiral spring 148. (See Fig. 32.) Of course the two rockers 130 and 131 are thereby released; but the rear hook-carriers 99' 99' are still supported in their positions by their hooks 170 170 engaging the last row of loops, while the front hook-carriers 99 99 are held in their inclined positions by their own weight. The screw-spindle 14, liberated from the nut-halves 27 27, is at once raised by the two weights 72 and 155. The nose 77' of the tappet 77 releases the lever 83 and moves to the left, while the latter under the action of its spring 87 returns to its initial position. (Shown in full lines at Fig. 3.) The right collar 140 on the rod 139 takes along with it the slide 134, so that the controller 135 engages in the recess 129' of the pronged latch 129 and pushes the latter to the left, so that first the front hooks 169 169 engage in the new row of loops, and then the rear hooks 170 170 withdraw from the last row of loops, whereupon the fabric moves upward and tightens the new row of loops. At this moment the pawl 75 takes along with it the lever 76, whereby the wire-cutting device is actuated and the wire cut. Then the pawl 75 is turned back to release the lever 76, which returns to its initial position, so that the two knives 110 110 are withdrawn. Shortly afterward the pronged latch 129 during its motion to the left strikes against the bolt 142, and thereby shifts the two shafts 126 and 127, with all the hook-carriers 99' 99, the hooks 170 169, and the fabric, to the right. At last the cross-head 37 on the rod 35 strikes against the horizontal arm of the T-piece 42', and thereby raises the other T-piece 42, while compressing the spiral spring 44. Then in the manner described above the weighted lever 34 is thrown over to its initial position for engaging the nut-halves 27 27 in the screw-spindle 14, and afterward the working spindle 6 is coupled with the driving-cone 7, whereupon the whole series of occurrences described above will repeat.

Should during the rotation of the working spindle 6 the point of the zigzagged wire from any reason fail to properly engage in the several meshes of the last row of loops or the zigzagged wire get spoiled, the hand-lever 10 is moved to the right to disconnect the working spindle from the driving-cone, and the weighted lever 34 is brought just into its vertical position without releasing the screw-spindle 14 from the nut-halves 27 27. Then the lever 76 may be depressed by hand to cut off the zigzagged wire and the fabric-guiding device, Figs. 21 and 22, may be opened by turning off the hooks 162 and turning downward the front levers 158 with their rail 160. The spoiled zigzagged wire can then be withdrawn from the fabric by hand, whereupon the front levers 158 are turned upward and secured by the hooks 162, and the working spindle 6 is again started. Of course the weighted lever 34 may be cautiously placed on the upper end of the hook 31 without moving the latter or the former may be checked in any convenient manner obvious to any one versed in the art to which this invention appertains.

The wire-netting machine described so far can be varied in many respects without deviating from the spirit of my invention.

What I claim as my invention, and desire to secure by Letters Patent, is—

1. In a wire-netting machine, the combination with a rotating blade for bending the wire in a zigzag line and twisting it with the last row of loops of the fabric, of means for feeding the fabric; a reversible device for cutting the zigzagged wire alternately in oppositely-inclined planes, and a mechanism for stopping said rotating blade after a predetermined number of revolutions, reversing and actuating said reversible device and restarting said rotating blade.

2. In a wire-netting machine, the combination with a rotating blade for bending the wire in a zigzag line and twisting it with the last row of loops of the fabric, of two rows of hooks alternately engaging the new row of loops and releasing the last row of loops respectively, a reversible device for cutting the zigzagged wire alternately in oppositely-inclined planes, and a mechanism for stopping said rotating blade after a predetermined number of revolutions, reversing and actuating said reversible device, actuating said two rows of hooks and restarting said rotating blade.

3. In a wire-netting machine, the combination with a rotating blade adapted to bend the wire in a zigzagged line, of means guiding the fabric and the zigzagged wire while the point of the latter consecutively engages in the several meshes of the last row of loops, two rows of rocking hooks adapted to alternately engage in the new row of loops and withdraw from the last row of loops respectively, a reversible device for cutting the zigzagged wire alternately in oppositely-inclined planes, and a mechanism for stopping said rotating blade after a predetermined number of revolutions, reversing and actuating said reversible device, actuating said two rows of rocking hooks and restarting said rotating blade.

4. In a wire-netting machine, the combination with a rotating blade adapted to bend the wire in a zigzag line, of means guiding the fabric and the zigzagged wire while the point of the latter consecutively engages in the several meshes of the last row of loops, two rows of rocking hooks adapted to alternately engage in the new row of loops and withdraw from the last row of loops respectively, a reversible device for cutting the zigzagged wire alternately in oppositely-inclined planes, and a mechanism for stopping said rotating blade after a predetermined number of revolutions, reversing and actuating said reversible device, actuating and shifting said two rows of rocking hooks with the fabric alternately in either direction through a certain distance and restarting said rotating blade.

5. In a wire-netting machine, the combination with a working spindle, of a blade adjustable in said working spindle and adapted to bend the wire in a zigzag line, a hollow shaft connected with said working spindle and partaking in its revolution, a screw-spindle longitudinally movable in said hollow shaft and prevented from turning therein, a stationary nut engaging and releasing said screw-spindle, a weight, a chain connecting said weight with said screw-spindle for returning the latter to the initial position when released, a tappet-disk on said screw-spindle, a reversible device for cutting the zigzagged wire alternately in oppositely-inclined planes, and a mechanism controlled by said tappet-disk and operated by said weight for stopping said working spindle and withdrawing said nut, reversing and actuating said reversible device and engaging said nut and restarting said working spindle.

6. In a wire-netting machine, the combination with a working spindle, of a blade adjustable in said working spindle and adapted to bend the wire in a zigzag line, a hollow shaft connected with said working spindle and partaking in its revolution, a screw-spindle longitudinally movable in said hollow shaft and prevented from turning therein, a stationary nut engaging and releasing said screw-spindle, two weights, two chains connecting said two weights with said screw-spindle for returning the latter to its initial position when released, a tappet-disk on said screw-spindle, means guiding the fabric and the zigzagged wire while the point of the latter consecutively engages in the several meshes of the last row of loops, two rows of rocking hooks adapted to alternately engage in the new row of loops and withdraw from the last row of loops respectively, a reversible device for cutting the zigzagged wire alternately in oppositely-inclined planes, and a mechanism controlled by said tappet-disk and said two weights for stopping said working spindle and withdrawing said stationary nut, reversing and actuating said reversible device, actuating said two rows of rocking hooks, engaging said nut and restarting said working spindle.

7. In a wire-netting machine, the combination with a working spindle, of a blade adjustable in said working spindle and adapted to bend the wire in a zigzag line, a hollow shaft connected with said working spindle and partaking in its revolution, a screw-spindle longitudinally movable in said hollow shaft and prevented from turning therein, a stationary nut engaging and releasing said screw-spindle, two weights, two chains connecting said two weights with said screw-spindle for returning the latter to its initial position when released, a tappet-disk on said screw-spindle, means guiding the fabric and the zigzagged wire while the point of the latter consecutively engages in the several meshes of the last row of loops, two rocking hooks adapted to alternately engage in the new row of loops and withdraw from the last row of loops respectively, a reversible device for cutting the zigzagged wire alternately on two different places in oppositely-inclined planes, and a mechanism controlled by said tappet-disk and said two weights for stopping said working spindle and withdrawing said stationary nut, reversing and actuating said reversible device, actuating and shifting said two rows of rocking hooks with the fabric alternately in either direction through a certain distance, engaging said nut and restarting said working spindle.

8. In a wire-netting machine, the combination with a working spindle, of a hollow shaft connected with said working spindle and partaking in its revolution, a screw-spindle longitudinally movable in said hollow shaft and prevented from turning therein, a reversible wire-cutting device, a weight, a chain connecting said weight with said screw-spindle for returning the latter to its initial position when released, a stationary nut engaging and releasing said screw-spindle, means controlled by said chain for reversing and actuating said reversible wire-cutting device, a driving-cone loose on said working spindle, a splined clutch movable on said working spindle, a lever controlling said splined clutch, a tappet-disk fastened on said screw-spindle, an adjustable bracket for determining the stroke of said screw-spindle, a tappet-lever on said adjustable bracket and adapted to be moved by said tappet-disk, and a mechanism connecting said lever with said tappet-lever and controlled by said chain for periodically stopping said working spindle and withdrawing said stationary nut, then engaging said stationary nut and restarting said working spindle.

9. In a wire-netting machine, the combination with a working spindle, of a blade adjustable in said working spindle and adapted to bend the wire in a zigzag line, means guiding the fabric and the zigzagged wire while the point of the latter consecutively engages in the several meshes of the last row of loops, two rows of rocking hooks adapted to alternately engage in the new row of loops and withdraw from the last row of loops respectively, a reversible device for cutting the zigzagged wire alternately in oppositely-inclined planes, means for alternately stopping said working spindle in two positions at one hundred and eighty degrees to each other, so that said blade is in the plane of the fabric and the zigzagged wire is in the right position to be cut and tightened in the fabric, and a mechanism for reversing and actuating said reversible device, actuating said two rows of rocking hooks and restarting said working spindle.

10. In a wire-netting machine, the combination with a working spindle, of a blade adjustable in said working spindle and adapted to bend the wire in a zigzag line, means guiding the fabric and the zigzagged wire while the point of the latter consecutively engages in the several meshes of the last row of loops, two rows of rocking hooks adapted to alternately engage in the new row of loops and withdraw from the last row of loops respectively, a reversible device for cutting the zigzagged wire alternately on two different places in oppositely-inclined planes, means for alternately stopping said working spindle in two positions at one hundred and eighty degrees to each other, so that said blade is in the plane of the fabric and the zigzagged wire is in the right position to be cut and tightened in the fabric, and a mechanism for reversing and actuating said reversible device, actuating and shifting said two rows of rocking hooks with the fabric alternately in either direction through a certain distance and restarting said working spindle.

11. In a wire-netting machine, the combination with a working spindle provided with a blade for bending the wire in a zigzag line, of a screw-spindle adapted to partake in the revolution of said working spindle and movable longitudinally, a stationary nut engaging and releasing said screw-spindle, a weight, a chain connecting said weight with said screw-spindle for returning the latter to its initial position when released, and a mechanism controlled by said screw-spindle, whereby said working spindle is stopped in an exact position with its blade in the plane of the fabric and said stationary nut withdrawn on said screw-spindle reaching its one extreme position and said stationary nut is engaged and said working spindle is restarted on said screw-spindle reaching its other extreme position.

12. In a wire-netting machine, the combination with a working spindle provided with a blade for bending the wire in a zigzag line, of a screw-spindle, adapted to partake in the revolution of said working spindle and movable longitudinally, a stationary nut engaging and releasing said screw-spindle, a weight, a chain connecting said weight with said screw-spindle for returning the latter to its initial position when released, a reversible wire-cutting device, means controlled by said chain for reversing and actuating said reversible wire-cutting device, and a mechanism controlled by said screw-spindle, whereby said working spindle is stopped alternately in two exact positions at one hundred and eighty degrees to each other with its blade in the plane of the fabric and restarted on said screw-spindle reaching its two extreme positions respectively, said stationary nut being withdrawn immediately after the stoppage and engaged immediately before the starting respectively.

13. In a wire-netting machine, the combination with a hollow shaft, of a screw-spindle movable in said hollow shaft and prevented from turning therein, a stationary nut engaging and releasing said screw-spindle, a weighted lever controlling said stationary nut, a bracket, a spring-pressed hook hinged to said weighted lever and adapted to snap over said bracket, a weighted locking-lever on said bracket and turning in a vertical plane over its axis and adapted to release said spring-pressed hook, a rod connected with said weighted locking-lever and adapted to raise said weighted lever on going upward, means for returning said screw-spindle to its initial position when released, a tappet-disk fastened on said screw-spindle, and a mechanism controlled by said screw-spindle longitudinally and by said tappet-disk angularly, whereby said hollow shaft is stopped in an exact position and said weighted locking-lever turned over to release said screw-spindle in its one extreme position and turned back to engage said screw-spindle in its other extreme position and said hollow shaft is restarted.

14. In a wire-netting machine, the combination with a working spindle provided with a blade for bending the wire in a zigzag line, of a screw-spindle adapted to partake in the revolution of said working spindle and movable longitudinally, a stationary nut engaging and releasing said screw-spindle, a weighted lever for actuating said stationary nut, a bracket, a spring-pressed hook hinged to said weighted lever and adapted to snap over said bracket for holding said stationary nut engaged, a weighted locking-lever on said bracket and turning in a vertical plane over its axis and adapted to release said spring-pressed hook from the bracket, a rod pivotally connected with the said weighted locking-lever and adapted to raise said weighted lever on moving upward, a weight, a chain connecting said weight with said screw-spindle for returning the latter to its initial position when released, a tappet-disk fastened on said screw-spindle, and a mechanism controlled by said screw-spindle longitudinally and by said tappet-disk angularly, whereby said working spindle is stopped in an exact position with its blade in the plane of the fabric and said weighted locking-lever is turned over to suddenly release said screw-spindle in its one extreme position and on this screw-spindle reaching its other extreme position said weighted locking-lever is turned back to engage it and said working spindle is immediately restarted.

15. In a wire-netting machine, the combination with a working spindle provided with a loose driving-cone and a splined clutch, of a hollow shaft adapted to partake in the revolution of said working spindle, a screw-spindle longitudinally movable in said hollow shaft and prevented from turning therein, a stationary nut engaging and releasing said screw-spindle, a weighted lever controlling said stationary nut, a bracket, a spring-pressed hook hinged to said weighted lever and adapted to snap over said bracket, a weighted locking-lever on said bracket and turning in a vertical plane over its axis and adapted to release said spring-pressed hook, a rod pivotally connected with said weighted locking-lever and adapted to raise said weighted lever on moving upward, a controlling-rod adapted to partake in the longitudinal motion of said screw-spindle, a weight, a chain connecting said weight with said controlling-rod for returning the latter with said screw-spindle to the initial position, a tappet-disk fastened on said screw-spindle, and a mechanism controlled by said controlling-rod and said tappet-disk for actuating said splined clutch and said weighted locking-lever, whereby said working spindle is stopped in an exact position and immediately said screw-spindle is released in its one extreme position and said screw-spindle is engaged in its other extreme position and immediately said working spindle is restarted.

16. In a wire-netting machine, the combination with a hollow shaft, of a screw-spindle longitudinally movable in said hollow shaft and prevented from turning therein, a stationary nut engaging and releasing said screw-spindle, a rod parallel to said screw-spindle and adapted to partake in its longitudinal motion, a weight, a chain connecting said weight with said rod for returning the latter with said screw-spindle to the initial position, a weighted lever controlling said stationary nut, a bracket, a spring-pressed hook hinged to said weighted lever and adapted to snap over said bracket, a weighted locking-lever on said bracket and turning in a vertical plane over its axis and adapted to release said spring-pressed hook, a link connected with said weighted locking-lever and adapted to raise said weighted lever on moving upward, an adjustable cam on said rod, means controlled by said adjustable cam for turning said weighted locking-lever in one direction to release said screw-spindle, a lever loose on the axle of said weighted locking-lever for turning the latter in the other direction to engage said screw-spindle, a tappet-disk fastened on said screw-spindle, and a mechanism controlled by said rod and said tappet-disk for stopping and starting said hollow shaft respectively.

17. In a wire-netting machine, the combination with a hollow shaft, of a screw-spindle longitudinally movable in said hollow shaft and prevented from turning therein, a stationary nut engaging and releasing said screw-spindle, a rod parallel to said screw-spindle and adapted to partake in its longitudinal motion, a weight, a chain connecting said weight with said rod for returning the latter with said screw-spindle to the initial position, a disk fastened on said screw-spindle and provided with a tappet, an adjustable bracket for determining the stroke of said screw-spindle, a lever on said adjustable bracket and adapted to be moved by the tappet of said disk, and a mechanism controlled by said rod and said lever for stopping and starting said hollow shaft and for withdrawing and engaging said stationary nut respectively.

18. In a wire-netting machine, the combination with a hollow shaft, of a screw-spindle longitudinally movable in said hollow shaft and prevented from turning therein, a stationary nut engaging and releasing said screw-spindle, a rod parallel to said screw-spindle and adapted to partake in its longitudinal motion, a weight, a chain connecting said weight with said rod for returning the latter with said screw-spindle to the initial position, a disk fastened on said screw-spindle and provided with two opposite tappets at different radii, an adjustable bracket for determining the stroke of said screw-spindle, a lever on said adjustable bracket and turning around the axis of said screw-spindle, a shifting pin on said lever and adapted to be in the path of either of the two tappets of said disk, a shaft parallel to said screw-spindle, a forked lever fastened on said shaft and adapted to embrace said rod and reduce its return under the action of said weight by half a pitch of said screw-spindle, means controlled by said shaft for shifting said shifting pin, and a mechanism controlled by said rod and said shifting pin for stopping and starting said hollow shaft and for withdrawing and engaging said stationary nut respectively.

19. In a wire-netting machine, the combination with two bearings facing the spiral guide and adjustable in a plane at right angles to the working spindle, of a shaft in said two bearings and cranked between them and provided with two axial cavities, two knife-carriers longitudinally movable in the axial cavities of said shaft, two knives at the internal ends of said two knife-carriers, means pressing said two knife-carriers outward, two cams bearing against the external ends of said knife-carriers, means actuating said cams so that said two knives cut the wire, a lever fastened on said shaft, and means for moving said lever alternately into either of two inclined planes.

20. In a wire-netting machine, the combination with two supports vertically adjustable on the machine-table, of a horizontal shaft mounted to turn in said two supports and cranked between them and provided with two axial cavities, two knife-carriers longitudinally movable in the axial cavities of said shaft, two knives at the internal ends of said two knife-carriers for cutting the wire, means pressing said two knife-carriers outward, two levers mounted in said two supports and having two cams adapted to bear against the external ends of said two knife-carriers, a vertical rod guided longitudinally in the machine-frame, a cross-head hinged to the upper end of said vertical rod, two links connecting the ends of said cross-head with said two levers, an actuating-lever pivotally connected between its two ends with said vertical rod and at the one end by a link with the machine-frame, and means for gripping and releasing said actuating-lever.

21. In a wire-netting machine, the combination with a wire-cutting device having an actuating-lever, of a working spindle, a screw-spindle adapted to partake in the revolution of said working spindle and movable longitudinally, a stationary nut engaging and releasing said screw-spindle, a weight, a chain connecting said weight with said screw-spindle to return the latter to the initial position when released, means for stopping said working spindle and withdraw said stationary nut in the one extreme position of said screw-spindle and for engaging said stationary nut and starting said working spindle in the other extreme position of said screw-spindle, a piston inserted between said weight and said chain and guided in the machine-frame and provided with a slot, a spring-pressed pawl in the slot of said piston and adapted to turn outward for gripping and moving said actuating-lever and to be turned back by a stop to release the actuating-lever.

22. In a wire-netting machine, the combination with a reversible wire-cutting device, of a lever for rocking said reversible wire-cutting device, a horizontal rod adapted to move said lever, a two-armed lever horizontally swinging on the machine-table and pivotally connected at the one arm with said horizontal rod, while the other arm is vertically movable, a spring pressing said two-armed lever in one direction to bring said reversible wire-cutting device into a position, a horizontal cam-plate on which the movable arm of said two-armed lever slides, a spring-pressed latch in said cam-plate and adapted to be depressed by and to snap behind the movable arm of said two-armed lever, a reversing-lever horizontally swinging on the machine-table and yielding vertically and provided with a cam, an elastic hook on the movable arm of said two-armed lever and adapted to take along with it said reversing-lever which slides down said cam-plate, a tappet adjustable on a horizontally-reciprocating machine part and adapted to alternately move in a direction the movable arm of said two-armed lever for reversing said reversible wire-cutting device and said reversing-lever to release by its cam the movable arm of said two-armed lever.

23. In a wire-netting machine, the combination with two shafts parallel to the fabric and mounted to rock in the machine-frame, of two rows of hooks secured on said two shafts and adapted to alternately engage in the new row of loops and withdraw from the last row of loops respectively, two rockers fastened on said two shafts and provided with inclined faces, two pronged latches horizontally guided on the machine-frame and gearing into each other so that the prongs of the one latch are adapted to engage the rear inclined faces of said two rockers for turning the latter to the front and that the prongs of the other latch engage the front inclined faces of said two rockers for turning the latter to the rear, a slide on the machine-frame and adapted to be moved by a horizontally-reciprocating machine part, a controller mounted to horizontally swing on said slide and adapted to push alternately either of said two pronged latches in a direction, two springs for returning said two pronged latches to the initial position, and means for reversing said controller to adjust it.

24. In a wire-netting machine, the combination with two shafts parallel to the fabric and mounted to rock on the machine-frame, of two rows of hook-carriers secured on said two shafts and provided with adjustable hooks adapted to alternately engage in the new row of loops and withdraw from the last row of loops respectively, means for rocking said two shafts, a cross-head adapted to simultaneously and longitudinally shift said two shafts while allowing them to turn, and means controlled by a horizontally-reciprocating machine part for shifting said cross-head alternately in two opposite directions.

25. In a wire-netting machine, the combination with two shafts parallel to the fabric and mounted to rock on the machine-frame, of two rigid hook-carriers at the ends of said two shafts near the wire-cutting device, two rows of elastic hook-carriers distributed over said two shafts and adapted to yield in the plane of the fabric, and means for rocking said two shafts.

26. In a wire-netting machine, the combination with two rails on both sides of the fabric at the last row of loops and adapted to guide the fabric, of means for adjusting the distance of said two rails, and means for turning off one of said two rails to release the fabric for withdrawing the zigzagged wire or other repairs.

27. In a wire-netting machine, the combination with two rails on both sides of the fabric at the last row of loops, a first row of levers on the machine-frame for supporting one of the said two rails and adjustable in planes at right angles thereto, a second row of levers hinged to said first row of levers for supporting the other of said two rails, a plurality of adjustable hooks for connecting said two rows of levers, and a plurality of troughs between said two rows of levers, the whole forming an opening and closing device for guiding the fabric and the zigzagged wire.

28. In a wire-netting machine, the combination with a working spindle, of a screw-spindle partaking in the revolution of said working spindle and movable longitudinally, means for stopping and restarting said working spindle also engaging and releasing said screw-spindle, a weight, a chain connecting said weight with said screw-spindle for returning it to its initial position, two shafts parallel to the fabric and mounted to rock in the machine-frame, two rows of hooks on said two shafts for alternately engaging the new row of loops and releasing the last row of loops respectively, a cross-head adapted to simultaneously and longitudinally move said two shafts for shifting the fabric, a rod inserted in said chain parallel to said two shafts, means for periodically transmitting the motion of said rod under the action of said weight to said cross-head in either direction, a rack inserted in said chain, a pinion in a stationary guide and engaging in said rack, and a fly-wheel on the axle of said pinion for assisting said weight during the shifting of the fabric.

In testimony whereof I have signed my name to this specification in the presence of two subscribing witnesses.

OTTO TÜRKE.

Witnesses:
ERNST GUMPERT,
ANSON WALTER.